United States Patent
Kim

(10) Patent No.: US 8,175,033 B2
(45) Date of Patent: May 8, 2012

(54) APPARATUS AND METHOD FOR CHANGING NETWORK ATTACH MODE IN MOBILE COMMUNICATION TERMINAL

(75) Inventor: Roe-Kwan Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 844 days.

(21) Appl. No.: 11/702,429

(22) Filed: Feb. 5, 2007

(65) Prior Publication Data

US 2007/0206601 A1    Sep. 6, 2007

(30) Foreign Application Priority Data

Feb. 3, 2006   (KR) .................. 10-2006-0010396

(51) Int. Cl.
*H04W 4/00* (2009.01)
(52) U.S. Cl. ................ 370/328; 370/310.2; 370/338
(58) Field of Classification Search ........... 370/395.2, 370/349, 328, 338, 310.2, 331, 310; 455/404.2, 455/456.1, 432, 412.1, 435.2, 552.1, 557, 455/127.4, 436–444, 432.1–432.3, 435.1–435.3, 455/550.1, 553.1, 556.1, 556.2
See application file for complete search history.

(56) References Cited

U.S. PATENT DOCUMENTS

| | | | |
|---|---|---|---|
| 7,035,621 B1 * | 4/2006 | Hurtta .................. | 455/412.1 |
| 7,197,312 B2 * | 3/2007 | Gunaratnam et al. ........ | 455/445 |
| 2003/0153309 A1 * | 8/2003 | Bjelland et al. ............. | 455/432 |
| 2004/0246918 A1 * | 12/2004 | Evensen .................. | 370/328 |
| 2004/0248546 A1 * | 12/2004 | Bhaumick ................ | 455/404.2 |
| 2005/0180382 A1 * | 8/2005 | Kim et al. .................. | 370/349 |
| 2006/0128389 A1 * | 6/2006 | Hurtta ..................... | 455/445 |

* cited by examiner

*Primary Examiner* — Kent Chang
*Assistant Examiner* — San Htun
(74) *Attorney, Agent, or Firm* — The Farrell Law Firm, P.C.

(57) ABSTRACT

Provided are an apparatus and a method for changing a network attach mode in a mobile communication terminal using a GSM (Global System for Mobile) scheme and a GPRS scheme. The method includes determining whether a GPRS attach procedure fails due to a network problem in a predetermined auto attach mode; and changing the predetermined auto attach mode into a manual attach mode when the GPRS attach procedure fails due to the network problem.

8 Claims, 2 Drawing Sheets

APPARATUS AND METHOD FOR CHANGING NETWORK ATTACH MODE IN MOBILE COMMUNICATION TERMINAL

PRIORITY

This application claims priority under 35 U.S.C. §119 to a Korean application filed in the Korean Intellectual Property Office on Feb. 3, 2006 and allocated Serial No. 2006-10396, the contents of which are incorporated herein by reference.

BACKGROUND OF THE INVENTION

1. Field of the Invention

The present invention relates generally to an apparatus and a method for changing a network attach mode in a mobile communication terminal, and more particularly, to an apparatus and a method for changing a network attach mode in a mobile communication terminal using a Global System for Mobile (GSM) scheme and a General Packet Radio Service (GPRS) scheme.

2. Description of the Related Art

A mobile terminal using GSM and GPRS is required to perform a GPRS attach procedure to register itself in a Serving GPRS Support Node (SGSN), which is a member of a GPRS network. In the GPRS attach procedure, the mobile terminal transmits a registered network position, identification (ID), and security information to the SGSN, and then the SGSN accepts the attach attempt of the mobile terminal through a user authentication process and makes the mobile terminal ready for the GPRS.

Network providers define an auto attach mode and a manual attach mode according to a point of time where the mobile terminal is connected to the GPRS.

In the auto attach mode, the mobile terminal performs the GPRS attach procedure when power is turned on, and maintains the GPRS attach state such that a user can use the GPRS at any time. Additionally, the mobile terminal in the manual attach mode performs the GPRS attach mode when a GPRS-related service (e.g., Wireless Application Protocol (WAP), Multimedia Message Service (MMS), etc.) is executed, and terminates the GPRS attach mode when the executed GPRS-related service is terminated.

In the auto attach mode, because of constantly maintaining the GPRS attach state, a user can instantly use the GPRS as soon as the GPRS related service is requested. Contrarily, in the manual attach mode, the GPRS attach procedure is performed only when a user requests the GPRS-related service. Therefore, it takes time for the mobile terminal to connect to the GPRS. Since the user notices the delay in the manual attach mode, conventional network providers usually set the auto attach mode as a default mode.

When trying to connect with the GPRS, a GPRS attach method can be different according to an interface between a Mobile Switching Center (MSC) and a SGSN in a network of the mobile terminal. When there is no interface between the MSC and the SGSN, the mobile terminal tries to connect with the GSM and the GPRS separately. When there is an interface between the MSC and the SGSN, the mobile terminal tries to connect with the GSM and the GPRS simultaneously.

When the GPRS attach procedure fails in the auto attach mode, the mobile terminal reattempts the GPRS attach procedure periodically until the GPRS attach state is successful. At this point, in case that the mobile terminal is connected to the GSM and the GPRS separately, only the GSM is in use. In case that the mobile terminal is connected the GSM and the GPRS simultaneously, neither the GSM nor the GPRS cannot be in use. The GPRS attach failures can occur due to an interface problem of the MSC or the SGSN, an internal problem of the SGSN, and database.

On the other hand, when the GPRS attach procedure is successful in the auto attach mode, the mobile terminal continuously maintains a GPRS attach state even though the GPRS is not in use. That is, when each time a Routing Area (RA) is changed, the GPRS attach state is maintained in order to update the RA.

As described above, when the GPRS attach procedure is successful in the mobile terminal according to a conventional art, the mobile terminal maintains the GPRS attach state even if the GPRS is not in use. Therefore, network resources are wasted. Moreover, when the GPRS attach procedure fails, the mobile terminal reattempts the GPRS attach procedure until the GPRS attach procedure is successful. Therefore, the network load increases. In particular, when the GPRS attach procedure fails due to uncertain network problems, the increased network load can cause additional problems in the network.

SUMMARY OF THE INVENTION

An object of the present invention is to substantially solve at least the above problems and/or disadvantages and to provide at least the advantages below. Accordingly, an object of the present invention is to provide a method for changing a network attach mode in a mobile terminal.

Another object of the present invention is to provide an apparatus and a method for changing a network attach mode according to a network state in a mobile communication terminal using a GSM and a GPRS scheme.

Another object of the present invention is to provide an apparatus and a method for changing a GPRS attach mode according to a network state to reduce the waste of network resources in a mobile communication terminal using a GSM and a GPRS scheme.

According to one aspect of the present invention, a method for changing a GPRS (General Packet Radio Service) attach mode in a mobile terminal using a GSM (Global System for Mobile) scheme and a GPRS scheme, the method including determining whether a GPRS attach procedure fails due to a network problem in a predetermined auto attach mode; and changing the predetermined auto attach mode to a manual attach mode when the GPRS attach procedure fails due to the network problem.

According to another aspect of the present invention, an apparatus for changing a GPRS attach mode in a mobile terminal using a GSM scheme and a GPRS scheme, the apparatus including a microprocessor unit determining whether a GPRS attach procedure fails due to a network problem in a predetermined auto attach mode, and changing the predetermined auto attach mode into a manual attach mode when the GPRS attach procedure fails due to the network problem.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Hereinafter, an apparatus and a method for changing a network attach mode in a mobile communication terminal using a GSM scheme and a GPRS scheme will be described in detail.

Figure 1:
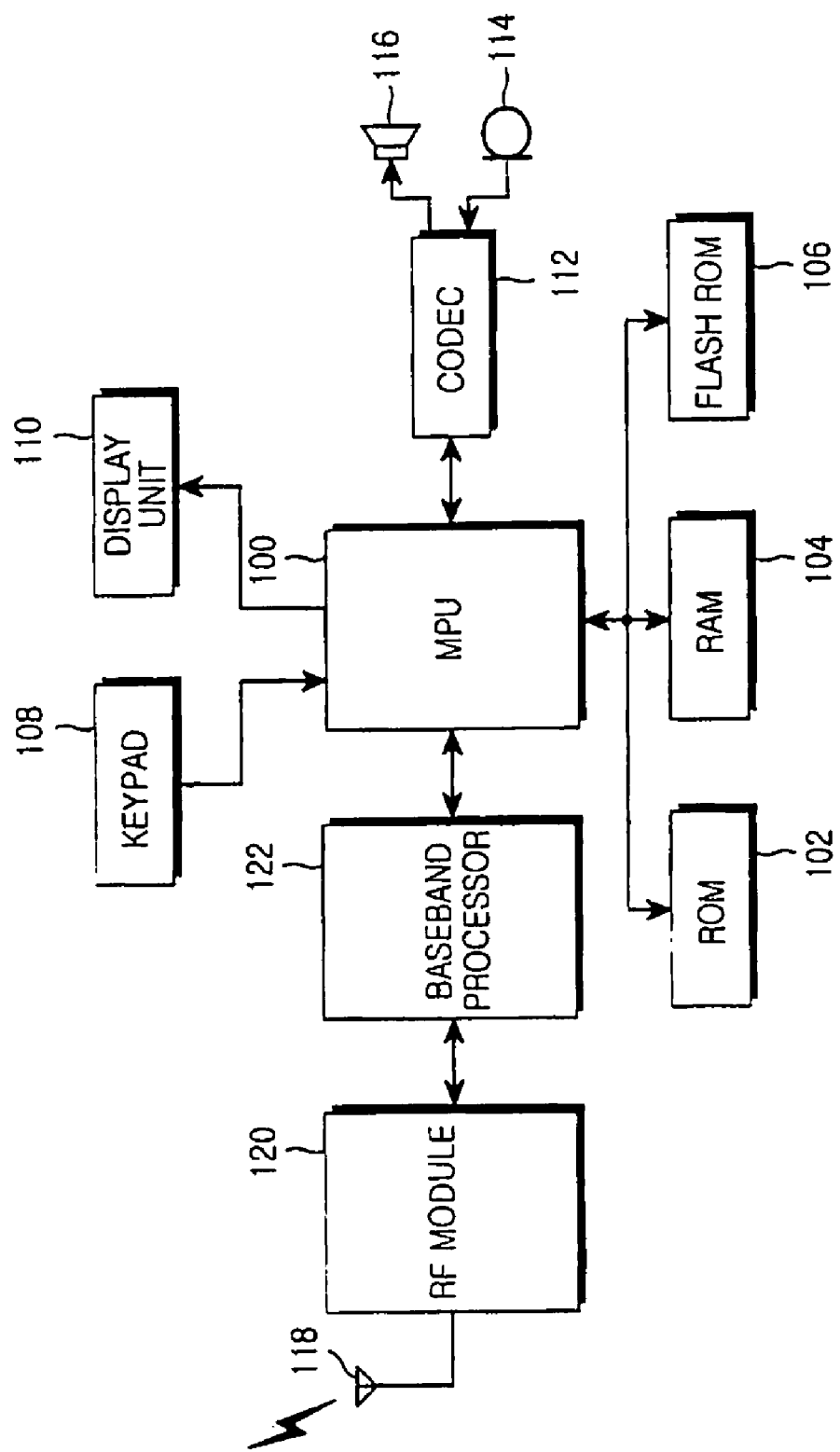
FIG. 1 is a block diagram of configuration of a mobile terminal according to the present invention.

FIG. 1 is a block diagram of configuration of a mobile terminal according to the present invention. It is assumed that the mobile terminal uses the GSM scheme and the GPRS scheme.

Referring to FIG. 1, a microprocessor unit (MPU) 100 controls overall operations of the mobile terminal. For example, the microprocessor 100 controls and processes voice communication and data communication, and also changes a GPRS attach mode according to the reason of a GPRS attach procedure failure besides conventional functions. Accordingly, descriptions for the process and the control of the microprocessor 100 will be omitted.

A Read Only Memory (ROM) 102 stores micro-codes of a program and various reference data for the process and control of the microprocessor 100. In particular, the ROM 102 stores a program for verifying the reason of the GPRS attach procedure failure during an auto attach mode, a program for changing the auto attach mode into a manual attach mode according to the failure reason, and a program for changing the manual attach mode into the auto attach mode. The RAM 104 is a working memory of the microprocessor 100, and stores temporary data generated while executing various programs. A flash ROM 106 stores renewable various data for storage such as a phone book, sent messages, and received messages.

A keypad 108 includes a plurality of function keys such as 0 to 9 number key buttons, a Menu button, a Cancel (or erase) button, an OK button, a Talk button, an End button, an Internet connection button, navigation key (or a direction key) buttons, and character input key buttons. The keypad 108 supplies key input data corresponding to a key that a user presses to the microprocessor 100.

A display 110 displays state information, the limited number of characters, and a relatively large volume of moving images and still images, which are generated during operations of the mobile terminal. The display 110 can use a color liquid crystal display (LCD) device.

A voice input/output block includes a CODEC (i.e., a coder-decoder) 112 connected to the microprocessor unit 100, and a speaker 116 and a microphone 114 connected to the CODEC 112. The CODEC 112 converts Pulse Code Modulation (PCM) data supplied from the microprocessor 100 into a voice signal to transmit the voice signal through the speaker 116, and also converts a voice signal supplied from the microphone 114 into PCM data to supply the PCM data to the microprocessor 100.

Moreover, a Radio Frequency (RF) module 120 down-converts a radio frequency signal received through an antenna 118 to supply the down-converted signal into a baseband processor 122, and also up-converts a baseband signal from the baseband processor 122 to transmit the up-converted signal through the antenna 118. The baseband processor 122 processes the baseband signal, which is transmitted and received between the RF module 120 and the microprocessor 100.

Figure 2:
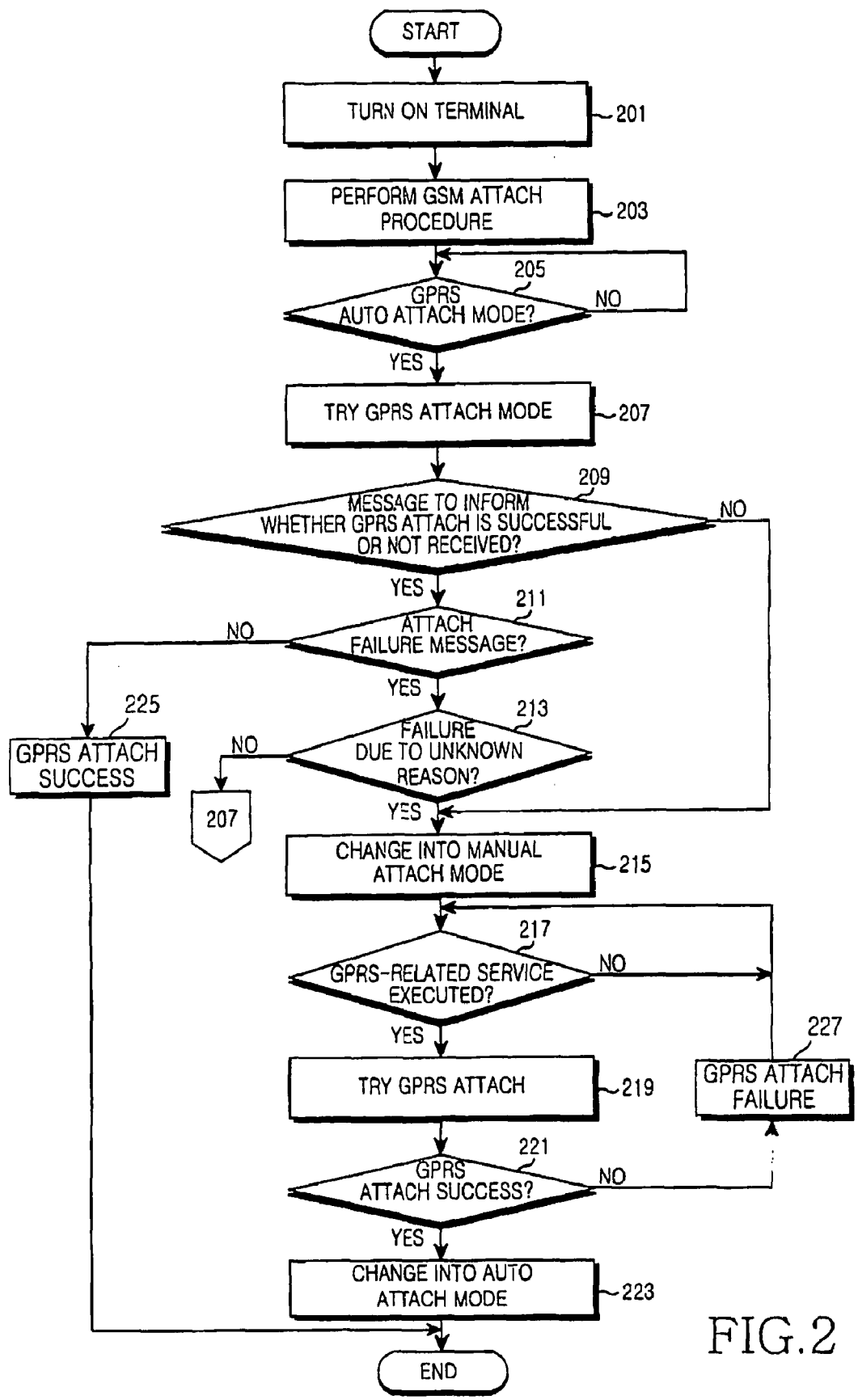
FIG. 2 is a flowchart of when a GPRS attach mode is changed according to a network state in a mobile terminal.

FIG. 2 is a flowchart of when a GPRS attach mode is changed according to a network state in a mobile terminal.

Referring to FIG. 2, the mobile terminal is turned on in step 201. In step 203, the microprocessor 100 performs a GSM attach procedure to use a GSM service.

In step 205, the microprocessor 100 determines whether a GPRS attach mode is an auto attach mode after performing the GSM attach procedure.

When the GPRS attach mode is an auto attach mode, the microprocessor 100 transmits a registered network position of the mobile terminal, ID, and security information into a SGSN that administers the GPRS, and then the SGSN accepts an attach attempt of the mobile terminal through a user authentication process and makes the mobile terminal ready for GPRS to retry the GPRS attach procedure in step 207.

In step 209, the microprocessor 100 determines whether a reply message for the GPRS attach procedure is received from the SGSN within a predetermined time. When the replay message for the GPRS attach is not received from the SGSN within the predetermined time, the microprocessor 100 concludes that there is a problem in the network, and changes an auto attach mode into a manual attach mode in the GPRS attach mode in step 215.

On the other hand, when the replay message for the GPRS attach is received within a predetermined time, the microprocessor 100 determines whether the reply message is a failure message for the GPRS attach procedure in step 211. In step 225, the microprocessor 100 completes the GPRS attach procedure, and terminates the process.

When the reply message is a success message for the GPRS attach procedure, the micro processor 100 determines whether the GPRS attach fails due to an unknown reason (e.g., an abnormal operation in a network) in step 213. When the GPRS attach procedure fails not because of an unknown reason, the micro processor 100 returns to step 207, and then reattempts the GPRS attach procedure.

When the GPRS attach procedure fails due to an unknown reason, the microprocessor 100 concludes that there is a problem in the network, and changes an auto attach mode into a manual attach mode in step 215.

After changing the auto attach mode into the manual attach mode, the microprocessor 100 determines whether a GPRS-related service (e.g., Wireless Application Protocol (WAP), and Multimedia Message Service (MMS)) is executed by a user in step 217. When the GPRS-related service is executed, the microprocessor 100 attempts the GPRS attach procedure in step 219.

In step 221, the microprocessor 100 determines whether a success message for the GPRS attach procedure is received from the SGSN. When the success message for the GPRS attach is not received, the microprocessor unit 100 concludes that the GPRS attach procedure fails in step 227.

When the success message for the GPRS attach procedure is received, the microprocessor 100 changes the manual attach mode into an auto attach mode, and maintains the GPRS attach state in step 223.

The microprocessor 100 then terminates the procedure.

According to the present invention, the GPRS attach mode is changed according to a network state in the mobile terminal using the GSM scheme and the GPRS scheme. Thus, a network resource consumption, which is due to continuous attach attempts for maintaining the GPRS attach state or a periodic RA update, can be minimized. Moreover, the mobile terminal can provide a stable GSM service without unnecessary signaling and regardless of a GPRS attach condition. Additionally, the problem of a user not being able to use other services when the network attach procedure repeatedly fails can be resolved according to the present invention.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for changing a GPRS (General Packet Radio Service) attach mode in a mobile terminal using a GSM (Global System for Mobile) scheme and a GPRS scheme, the method comprising the steps of:

determining whether a GPRS attach procedure fails due to a network problem in an auto attach mode; and changing the auto attach mode into a manual attach mode when the GPRS attach procedure fails due to the network problem, wherein the step of determining whether the GPRS attach fails due to the network problem comprises:

attempting the GPRS attach procedure in a SGSN (Serving GPRS Support Node) that administers the GPRS;

determining whether a reply message for the attempting of the GPRS attach procedure is received from the SGSN within a predetermined time;

concluding that the GPRS attach procedure fails due to the network problem when the reply message is not received within the predetermined time;

determining whether the reply message is a GPRS attach failure message when the reply message is received within the predetermined time;

determining whether the GPRS attach procedure fails due to an unknown reason when the reply message is the GPRS attach failure message;

concluding that the GPRS attach procedure fails due to a network problem when the GPRS attach procedure fails due to the unknown reason; and reattempting the GPRS attach procedure when the GPRS attach procedure does not fail due to the unknown reason.

2. The method of claim 1, further comprising:

determining whether a GPRS-related service is executed by a user in the manual attach mode;

reattempting the GPRS attach procedure when the GPRS-related service is executed by the user;

determining whether the reattempted GPRS attach procedure is successful; and changing the manual attach mode into the auto attach mode when the GPRS attach procedure is successful.

3. The method of claim 2, further comprising:

concluding that the GPRS attach procedure fails when the GPRS attach procedure fails; and determining whether the GPRS-related service is executed by the user.

4. An apparatus for changing a GPRS attach mode in a mobile terminal using a GSM scheme and a GPRS scheme, the apparatus comprising:

a microprocessor for determining whether a GPRS attach procedure fails due to a network problem in an auto attach mode, and changing the auto attach mode into a manual attach mode when the GPRS attach procedure fails due to the network problem, wherein the microprocessor performs the step of determining whether the GPRS attach fails due to the network problem by performing the steps of attempting the GPRS attach procedure in a SGSN (Serving GPRS Support Node) that administers the GPRS, determining whether a reply message for the attempting of the GPRS attach procedure is received from the SGSN within a predetermined time, and concluding that the GPRS attach procedure fails due to the network problem when the reply message is not received within the predetermined time, wherein the microprocessor further performs the steps of determining whether the reply message is a GPRS attach failure message when the reply message is received within the predetermined time, determining whether the GPRS attach procedure fails due to an unknown reason when the reply message is the GPRS attach failure message, concluding that the GPRS attach procedure fails due to a network problem when the GPRS attach procedure fails due to the unknown reason, and reattempting the GPRS attach procedure when the GPRS attach procedure does not fail due to the unknown reason.

5. The apparatus of claim 4, wherein the microprocessor further performs the steps of determining whether a GPRS-related service is executed by a user in the manual attach mode, reattempting the GPRS attach procedure when the GPRS-related service is executed by the user, determining whether the reattempted GPRS attach procedure is successful, and changing the manual attach mode into the auto attach mode when the GPRS attach procedure is successful.

6. The apparatus of claim 5, wherein the microprocessor further performs the steps of concluding that the GPRS attach procedure fails when the GPRS attach procedure fails, and determining whether the GPRS-related service is executed by the user.

7. A method for changing a second service attach mode in a mobile terminal using a first service scheme and a second service scheme, the method comprising the steps of:

determining whether a second service attach procedure fails due to a network problem in an auto attach mode; and changing the auto attach mode into a manual attach mode when the second service attach procedure fails due to the network problem, wherein determining whether the second service attach procedure fails due to the network problem comprises:

attempting the second service attach procedure in a SGSN (Serving GPRS Support Node) that administers the GPRS;

determining whether a reply message for the attempting of second service attach procedure is received from the SGSN within a predetermined time;

concluding that the second service attach procedure fails due to the network problem when the reply message is not received within the predetermined time;

determining whether the reply message is a GPRS attach failure message when the reply message is received within the predetermined time;

determining whether the GPRS attach procedure fails due to an unknown reason when the reply message is the GPRS attach failure message;

concluding that the GPRS attach procedure fails due to a network problem when the GPRS attach procedure fails due to the unknown reason; and reattempting the GPRS attach procedure when the GPRS attach procedure does not fail due to the unknown reason.

8. An apparatus for changing a second service attach mode in a mobile terminal using a first service scheme and a second service scheme, the apparatus comprising:

a microprocessor for determining whether a second service attach procedure fails due to a network problem in an auto attach mode, and changing the auto attach mode into a manual attach mode when the second service attach procedure fails due to the network problem, wherein the microprocessor determines whether the second service attach procedure fails due to the network problem by:

attempting the second service attach procedure in a SGSN (Serving GPRS Support Node) that administers the GPRS;

determining whether a reply message for the attempting of second service attach procedure is received from the SGSN within a predetermined time;

concluding that the second service attach procedure fails due to the network problem when the reply message is not received within the predetermined time;

determining whether the reply message is a GPRS attach failure message when the reply message is received within the predetermined time;

determining whether the GPRS attach procedure fails due to an unknown reason when the reply message is the GPRS attach failure message; and concluding that the GPRS attach procedure fails due to a network problem when the GPRS attach procedure fails due to the unknown reason; and reattempting the GPRS attach procedure when the GPRS attach procedure does not fail due to the unknown reason.

* * * * *